United States Patent [19]
Frank

[11] Patent Number: 5,991,014
[45] Date of Patent: Nov. 23, 1999

[54] LIGHT SENSING DEVICE FOR SENSING THE LIGHT OUTPUT OF A BULB

[75] Inventor: Jerome D. Frank, Bethesda, Md.

[73] Assignee: Fusion UV Systems, Inc., Gaithersburg, Md.

[21] Appl. No.: 08/840,709

[22] Filed: Apr. 25, 1997

[51] Int. Cl.[6] .................................................. G01J 1/90
[52] U.S. Cl. ...................... 356/213; 356/226; 356/230; 356/221
[58] Field of Search .................................. 356/213, 226, 356/230, 221

[56] References Cited

U.S. PATENT DOCUMENTS

| | | |
|---|---|---|
| 4,042,850 | 8/1977 | Ury et al. . |
| 4,504,768 | 3/1985 | Ury et al. . |
| 4,652,790 | 3/1987 | Wood . |
| 4,703,173 | 10/1987 | Wood et al. . |
| 4,868,509 | 9/1989 | Ury et al. . |
| 5,051,663 | 9/1991 | Ury et al. . |
| 5,117,312 | 5/1992 | Dolan . |

OTHER PUBLICATIONS

B.P. Turner, et al., "Sulfur Lamps–Progress in their Development", Illuminating Engineering Society of North America, Annual Conference, New York, New York, Aug. 1995.

*Primary Examiner*—Robert H. Kim
*Assistant Examiner*—Reginald A. Ratliff
*Attorney, Agent, or Firm*—Shlesinger, Arkwright & Garvey, LLP

[57] ABSTRACT

A light sensing device for sensing the light output of a bulb in a lamp comprises a fiber-optic light guide having first and second ends and a photodetector. The first end is optically coupled to a projection of a bulb in the lamp and is adapted to pick up light transmitted through the projection from within the bulb. The second is optically coupled to the photodetector such that light exiting from the second end impinges on the photodetector to generate an output indicative of the light output of the bulb.

16 Claims, 2 Drawing Sheets

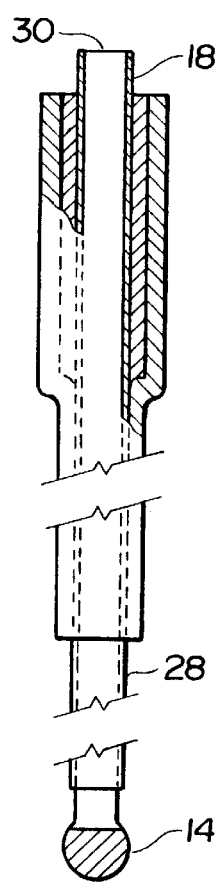
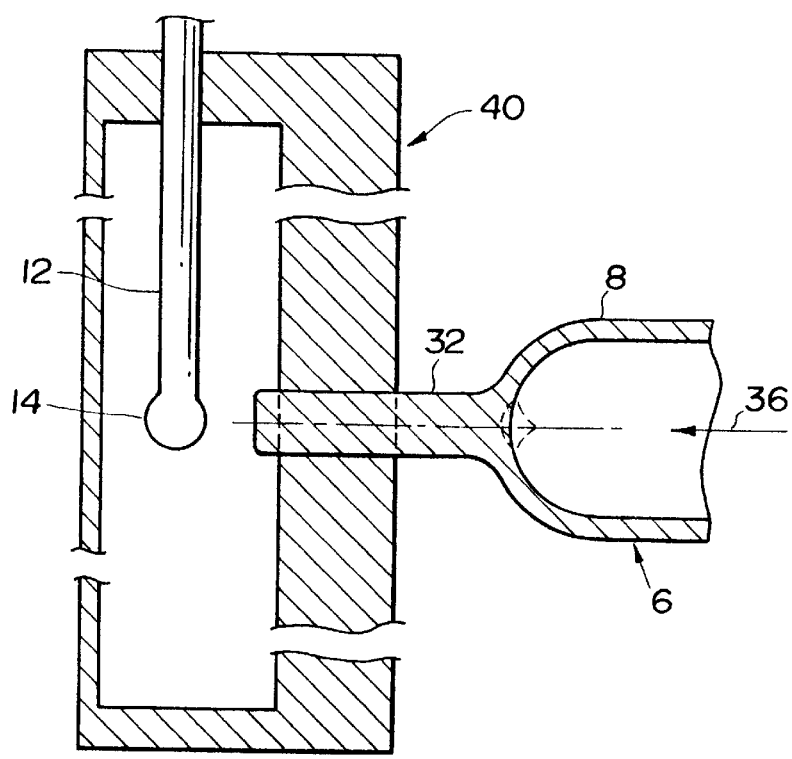
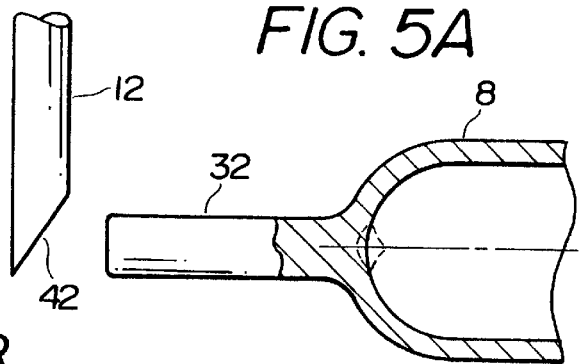
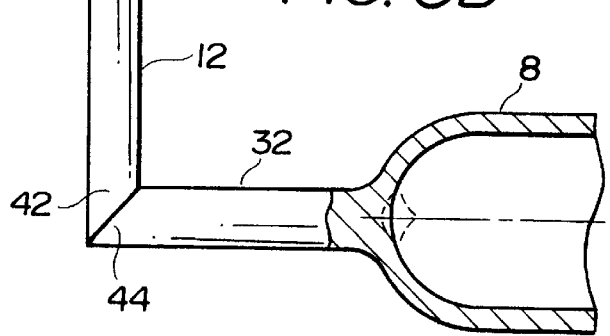

LIGHT SENSING DEVICE FOR SENSING THE LIGHT OUTPUT OF A BULB

FIELD OF THE INVENTION

The present invention relates to electrodeless discharge lamps and in particular to a light sensing device utilizing the light output of the lamp to provide an output that can be used to control internal or external devices associated with the operation of the lamp.

BACKGROUND OF THE INVENTION

An electrodeless discharge lamp is well known in the art. U.S. Pat. No. 3,872,349, discloses a typical electrodeless lamp powered by a microwave energy to generate plasma within the bulb and thereby generate visible and invisible light.

A standard electrodeless lamp uses a photocell that picks up visible light coming from the bulb and is part of the control circuit to indicate whether the bulb during starting has started or if the bulb has stopped running. For safety reasons, it is essential that the microwave energy source be turned off if the bulb stops working or if the bulb fails to start. The photocell is generally disposed outside of the microwave cavity and is directed through one of the ventilating holes such that the light radially emitted from the bulb enters the photocell, effecting the state of the photocell which can be sensed by the associated electronic circuitry.

The standard electrodeless lamps are typically used in concert with other lamps in a number of geometries, such as side by side, in rows or in a configuration where the lamps face each other. An improperly operating lamp, e.g., a lamp that fails to start or fails during operation, may not be detected by its own photocell because of stray light coming from the other lamps operating nearby. The resulting cross-interferences between the lamps prevents the prior art photocell configuration from discriminating between light coming from its own bulb and light that is coming in from another lamp.

There is, therefore, a need for a light sensing device for sensing the light output of a bulb that obviates the shortcomings of prior art devices.

OBJECTS AND SUMMARY OF THE INVENTION

It is an object of the present invention to provide a light sensing device for sensing light given off by a bulb for use in controlling internal or external devices, such as controlling the power input to the lamp if the bulb fails to start or stops working.

It is another object of the present invention to provide a light sensing device that can discriminate between light coming from the bulb and light coming from other lamps.

It is still another object of the present invention to provide a lamp that be grouped with other lamps in various configurations without causing interferences among the lamp control circuitry that depends on the light output of the individual bulbs.

It is another object of the present invention to provide a light sensing device that senses light emanating from within the bulb by using the fiber-optic properties of the bulb itself.

In summary, the present invention provides a light sensing device for sensing the light output of a bulb in a lamp, comprising a fiber-optic light guide one end of which is optically coupled to a projection of a bulb and the other end to a photodetector. The bulb projection acts as a light guide so that the amount of light that is channeled through the guide from within the bulb is substantially higher than the amount of light coming from other sources. The output of the photodetector is used for control functions, such as to shut-off or reduce the power input to the bulb, start/stop other devices, etc.

The present invention also provides a lamp utilizing the above light sensing device to minimize cross-interferences from other lamps when the lamp is used in a configuration where stray light from other lamps could easily impinge on each other.

BRIEF DESCRIPTIONS OF THE DRAWINGS

FIG. 3 is an enlarged fragmentary view, with portions shown in cross-section, of the light guide used in the present invention.

FIG. 4 is an enlarged, fragmentary cross-sectional view of an end portion of the bulb of FIG. 1, showing in detail one end of the fiber-optic light guide coupled to the projecting end of the bulb within an enclosure.

FIGS. 5A and 5B are alternative embodiments of the optical coupling shown in FIG. 4 between the end portion of the bulb to the light guide.

DETAILED DESCRIPTION OF THE INVENTION

Figure 1:
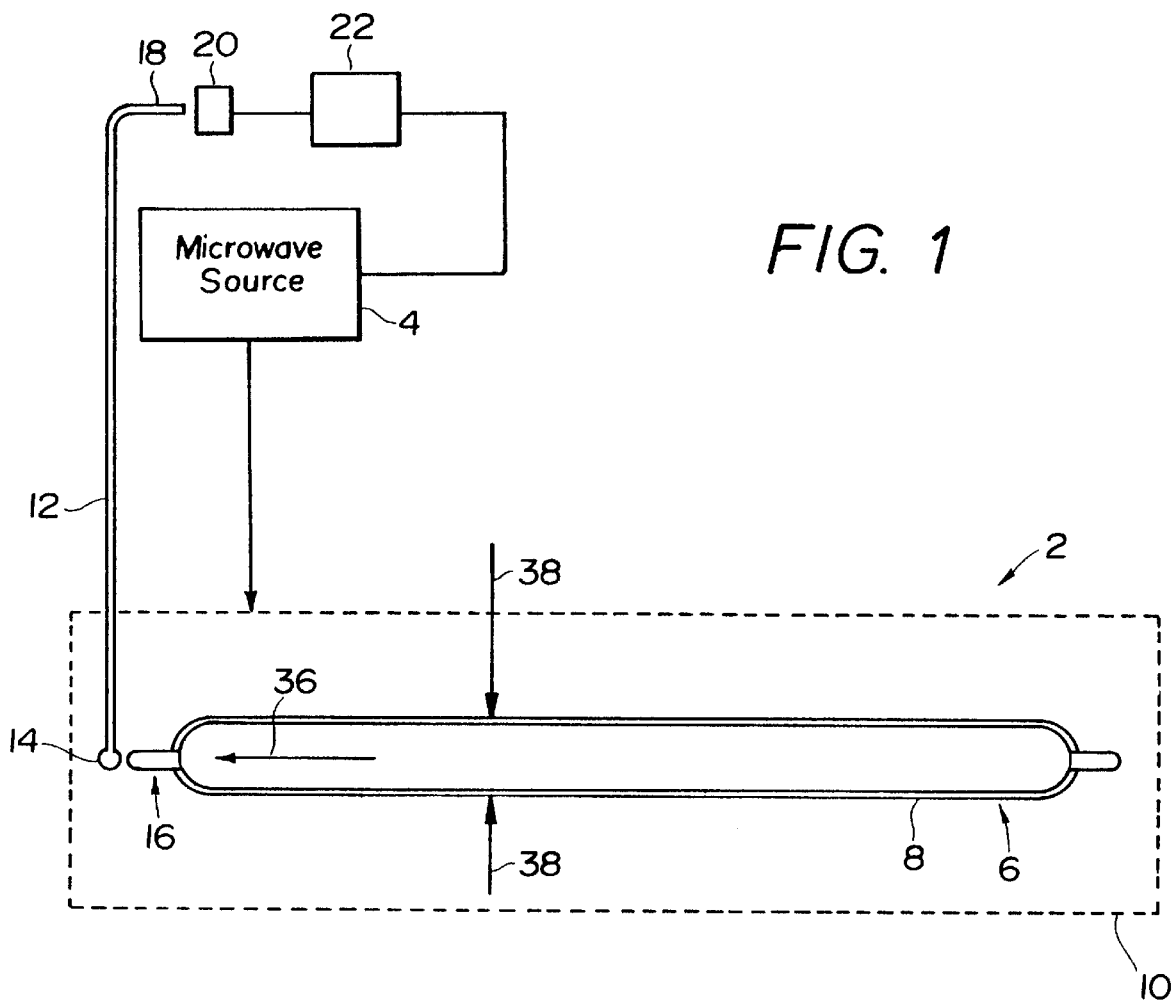
FIG. 1 is a schematic diagram of a lamp utilizing a light sensing device made in accordance with the present invention.

An electrodeless lamp 2 using the present invention is disclosed in FIG. 1. The lamp 2 is shown being powered by a microwave source 4, although other power sources maybe used. The lamp 2 comprises a bulb 6 having an envelope 8 and a discharge forming fill within the envelope. The bulb 6 is disposed within a microwave chamber or cavity 10, including a reflector and a mesh which is transparent to the radiation emitted by the fill, but which is substantially reflective to the microwave energy.

A fiber-optic light guide 12 has an end portion 14 disposed adjacent to an end portion 16 of the bulb 6. The other end portion of the light guide 12 is disposed adjacent to a photodetector 20 whose output is fed to a control circuit 22. Based on the amount of light coming from the bulb 6, and hence the output of photodetector 20, as compared to reference level, certain control functions may be initiated, such as turning off the microwave source 4 when the output signal of the photodetector 20 falls below a pre-determined level, adjusting the power level to the bulb 6 after a successful start, or starting/stopping external devices, such as a printing press, conveyor, ventilating fans, etc, after the bulb has successfully started. The detector may also be used as a sensing element for the control of a feedback loop. Determination of the reference level may include several considerations, such as the lowest possible light output available from the lamp, available stray light in a specific application environment, etc.

In the embodiment shown in FIG. 1, the output of the control circuit 22 is used to turn off the microwave power source 4 in case the bulb fails to start or if the bulb suddenly stops working. The light guide 12 is preferably made of fused silica.

The photodetector 20 is preferably cadmium sulfide type, which responds to the visible light generated by the bulb 6. Other types of photodetectors may be used such as silicon photodiodes, charge coupled devices, etc. that are sensitive enough to the available visible light coming from the bulb.

Figure 2:
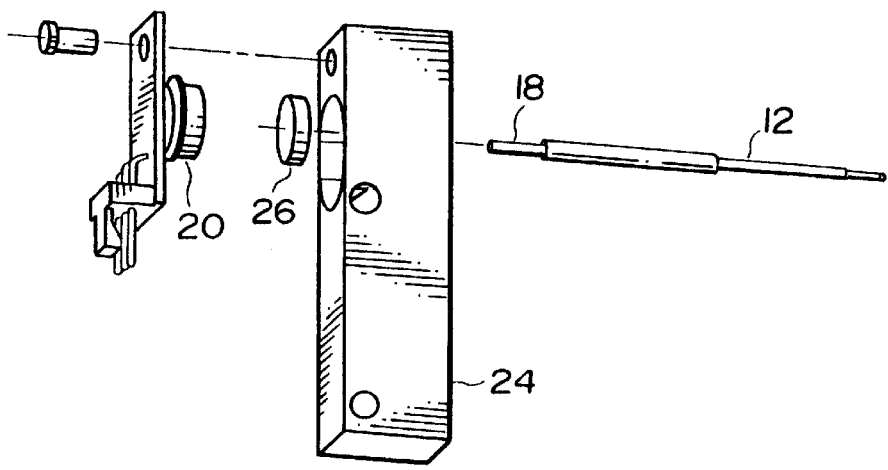
FIG. 2 is a perspective assembly view showing a photodetector, a protective optical disk, a housing and a fiber-optic light guide used in the lamp of FIG. 1.

The photo detector 20 is disposed within housing 24, as best shown in FIG. 2, to advantageously shield the photodetector 20 from ambient light. A light transmissive disc 26 is disposed within the housing 24 between the photo detector 20 and the end portion 18 of the light guide 12. The disc 20 advantageously is made of boro-silicate glass to provide protection to the detector 20 against harmful UV light generated by the bulb 6. The disc 26 may also be a filter, such as welder's glass, to attenuate the bright light generated by a high-intensity bulb, such as a mercury lamp, or otherwise match the light exiting from the light guide to the spectral characteristics of the photodetector 20.

The photodetector assembly is advantageously disposed outside the microwave chamber 10 so that it is away from the harmful effects of the microwave power being generated during normal operation of the lamp 2.

The housing 24 is advantageously opaque to ambient light, so that the only light impinging on the detector 20 is the light coming from the end 18 of the light guide 12.

The end portion 14 of the light guide 12 is preferably spherical with a surface roughened with 600 grit silicon carbide paper, or other suitable means, to direct light coming out of the bulb end portion 16 into the light guide 12. The light guide 12 has a cladding 28 for physical protection and to minimize stray light from entering the light guide 12. The end portion 18 of the light guide 12 has a smooth surface 30 that is optically coupled to the photodetector 20.

The bulb 6 has fiber-optic properties that is used to discriminate between light emanating from within the bulb and light coming from the outside. Light emitted from within the bulb has an axial component 36 that is optically coupled to the bulb wall or envelope 8 which in turn transmits the light through a cylindrical portion or nubbin 32 to the fiber-optic pickup portion 14. Conversely, light from other sources (i.e. other lamps) will have substantially radial components 38 and thus will not be optically coupled to the bulb wall. This phenomenon provides a high level of discrimination between light generated by the bulb and all other sources.

The fiber-optic behavior of the bulb 6 is attributable to its elongated cylindrical shape, which is similar to a fiber-optic light guide, so that light impinging transversely on it from other sources, such as light from neighboring lamps, would not he launched into its wall, but would simply pass through it and whatever small amount that gets in would produce a relatively small signal compared to that generated by direct light coming from the bulb plasma. Hence, the amount of light produced by the bulb plasma would very much exceed the amount of stray light that is captured by the bulb wall 8.

The bulb support/reflector structure 40 advantageously provides an enclosure around the bulb nubbin 32 and the end portion 14 of the light guide, thereby minimizing ambient light from being picked up by the light guide 12.

The end portion 14 of the light guide 12 may also be beveled, as generally indicated at 42, to capture the light emanating from the nubbin 32, as best shown in FIG. 5A. The nubbin 32 may also have a parallel bevel surface 44 adapted to mate with the bevel 42 for efficient optical coupling between the nubbin 32 and the light guide 12, as best shown in FIG. 5B. Other optical coupling arrangements may be made.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention or the limits of the appended claims.

I claim:

1. A lamp, comprising:

a) a bulb having an envelope;

b) a longitudinal light-transmitting member having one end secured to said envelope and another end disposed away from said envelope, said member being configured to transmit a portion of light generated by said bulb;

c) a photodetector;

d) a fiber-optic light guide having first and second ends, said first end being coupled to said another end to pick up light transmitted through said member from within said bulb;

e) said second end being coupled to said photodetector; and f) a control circuit coupled to said photodetector, said control circuit being configured to operate the lamp in response to the light transmitted through said member.

2. A lamp as in claim 1, wherein said first end includes a spherical surface.

3. A lamp as in claim 2, wherein said spherical surface is roughened.

4. A lamp as in claim 1, wherein said first end of said light guide includes a beveled surface directed toward said another end.

5. A lamp as in claim 4, wherein said another end includes a beveled surface disposed parallel to said first end beveled surface.

6. A lamp as in claim 1, wherein:

a) said member has a longitudinal axis; and b) said first end is disposed substantially transversely to said longitudinal axis.

7. A lamp as in claim 1, and further comprising a light transmissive disk disposed between said photodetector and said second end.

8. A lamp as in claim 7, wherein said disk is an attenuator.

9. A lamp as in claim 7, wherein said disk is a filter.

10. A lamp as in claim 1, wherein said photodetector is responsive to visible light.

11. A lamp as in claim 1, and further comprising:

a) an enclosure; and b) said another end and said first end are disposed within said enclosure.

12. A lamp as in claim 1, wherein said member is cylindrical in cross-section.

13. A lamp as in claim 1, wherein:

a) said bulb is elongated having a longitudinal axis; and b) said longitudinal member aligned to said axis.

14. A lamp, comprising:

a) a stationary bulb having an envelope;

b) a power source operatively coupled to said bulb;

c) a light-transmitting member having one end secured to said envelope and another end disposed away from said envelope, said member being configured to transmit a portion of the light generated by said bulb;

d) a photodetector;

e) a fiber-optic light guide having first and second ends, said first end being coupled to said another end to pick up the light transmitted through said member from within said bulb;

f) said second end being coupled to said photodetector; and g) a control circuit coupled to said photodetector, said control circuit being configured to turn off said power source when the light output from said bulb transmitted through said member falls below a threshold value.

15. A lamp as in claim 14, and further comprising:

a) an enclosure configured to minimize ambient light from entering thereinto; and b) said another end and said first end are disposed within said enclosure.

16. A lamp as in claim 14, wherein said power source includes a microwave source.

* * * * *